(12) United States Patent
Lindquist et al.

(10) Patent No.: US 8,191,100 B2
(45) Date of Patent: May 29, 2012

(54) METHOD AND TERMINAL FOR PROVIDING IPTV TO MULTIPLE IMS USERS

(75) Inventors: Jan Erik Lindquist, Älvsjö (SE); Fredrik Persson, Älvsjö (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 572 days.

(21) Appl. No.: 12/236,673

(22) Filed: Sep. 24, 2008

(65) Prior Publication Data

US 2009/0307736 A1    Dec. 10, 2009

Related U.S. Application Data

(60) Provisional application No. 61/058,793, filed on Jun. 4, 2008.

(51) Int. Cl.
*H04N 7/173* (2006.01)

(52) U.S. Cl. .......... 725/110; 725/109; 725/105

(58) Field of Classification Search .......... 725/110
See application file for complete search history.

(56) References Cited

U.S. PATENT DOCUMENTS

| | | | |
|---|---|---|---|
| 2007/0121869 A1* | 5/2007 | Gorti et al. | 379/201.02 |
| 2007/0199015 A1 | 8/2007 | Lopez et al. | |
| 2008/0022322 A1* | 1/2008 | Grannan et al. | 725/78 |

FOREIGN PATENT DOCUMENTS

WO    WO 0049801 A1    8/2000

OTHER PUBLICATIONS

Telecommunications and Internet Converged Services and Protocols for Advanced Networking (TISPAN); Service Layer Requirements to Integrate NGN Services and IPTV; draft ETSI TS 181 016, ETSI Standards v. 0.0.5, Feb. 1, 2007, pp. 11-24.

* cited by examiner

*Primary Examiner* — Brian T. Pendleton
*Assistant Examiner* — Olugbenga Idowu

(57) ABSTRACT

A method and terminal for providing Internet Protocol Television (IPTV) and other communication services to a group of users, such as a family, using an IP Multimedia Subsystem (IMS) network. A group private user identity is associated with a group public user identity and with a plurality of individual public user identities, each of which is associated with a different user in the group. Utilizing the group private User ID and the group public User ID, a browser registers a group subscription with the IMS network. When an individual user enters an identifier such as a PIN, the individual is then registered with the IMS network, while maintaining the group registration with the IMS network and the IPTV network. Individual users can be changed without having to restart the browser.

15 Claims, 6 Drawing Sheets

METHOD AND TERMINAL FOR PROVIDING IPTV TO MULTIPLE IMS USERS

CROSS-REFERENCE TO RELATED APPLICATIONS

This application claims the benefit of U.S. Provisional Application No. 61/058,793 filed Jun. 4, 2008, the disclosure of which is incorporated herein in its entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

The present invention relates to communication systems. More particularly, and not by way of limitation, the present invention is directed to a method and terminal for providing Internet Protocol Television (IPTV) and other services to multiple users of an IP Multimedia Subsystem (IMS) network.

Conventionally, IPTV is delivered to the home through a broadband connection from an IPTV service provider to a Set Top Box (STB) connected to a television set. The STB includes a browser, and all IPTV features are controlled over a browser interface. Thus, the IPTV delivery process is browser-centric. A Session Initiation Protocol (SIP) User Agent in the STB adapts IPTV to IMS requirements.

A problem with adapting IPTV to IMS is that the browser currently has no concept of individual IMS users. So in the case of a group of users such as a family having a family subscription with different user accounts for the individual family members, the browser must be restarted every time a family member logs into a different user account within the family subscription. The user experience is adversely affected by having to restart the browser when simply switching users.

SUMMARY

The user experience would be improved by eliminating the requirement to restart the browser when switching users, while still providing the full functionality of the IMS network so that combined services (service blending) with services such as Presence, Messaging, and Chat services can be provided as well. The present invention provides a method and terminal for achieving these results.

The present invention provides simplified provisioning of the STB with IMS user information, quicker response time when switching users in the browser, and closer control of the user experience by the service provider with control of the PIN, aliases, and adding/removing new users in a group. A single IMS Private User Identity (IMPI) and password is shared by the whole subscription.

Thus, in one aspect, the present invention is directed to a method of providing Internet Protocol Television (IPTV) and other communication services to a group of users of an IP Multimedia Subsystem (IMS) network. The method includes the steps of associating a group private user identity with a group public user identity and with a plurality of individual public user identities, each associated with a different user in the group; registering a group subscription with the IMS network and an IPTV network utilizing the group private user identity and the group public user identity; and registering a first individual user with the IMS network only when the individual public user identity associated with the first individual user is received, while maintaining the group registration with the IMS network and the IPTV network. The method may also include receiving an indication of a change of user from the first individual user to a second individual user; and registering the second individual user with the IMS network in response to the user change, while maintaining the group registration with the IMS network and the IPTV network.

In another aspect, the present invention is directed to a terminal for providing IPTV and other communication services to a group of users of an IMS network. The terminal includes means for associating a group private user identity with a group public user identity and with a plurality of individual public user identities, each associated with a different user in the group; means for registering a group subscription with the IMS network and an IPTV portal utilizing the group private user identity and the group public user identity; and means for registering a first individual user with the IMS network only when the individual public user identity associated with the first individual user is received, while maintaining the group registration with the IMS network and the IPTV network.

BRIEF DESCRIPTION OF THE SEVERAL VIEWS OF THE DRAWING

In the following section, the invention will be described with reference to exemplary embodiments illustrated in the figures, in which.

DETAILED DESCRIPTION

The present invention provides a method and terminal for providing IPTV to multiple IMS users without requiring the browser to be restarted when switching between users. Full IMS functionality is also maintained.

In an exemplary embodiment, the browser is initiated on a family or group subscription account and never changes accounts. The browser connects to a portal, which keeps track of all the individual accounts under the group subscription and controls the switching between users in the group transparently to the browser. This enables the portal to control the PIN code for the group subscription (typically a simple 4 digit number). Additional benefits are explained below.

In one embodiment, an Application Programming Interface (API) is introduced into the browser based, for example, on javascript properties and methods. The API controls the local object code to register different users to IMS. Thus, the group subscription account is always logged into IMS and to the portal, while individual group members are logged on to IMS only when those individual accounts are invoked.

Figure 1:
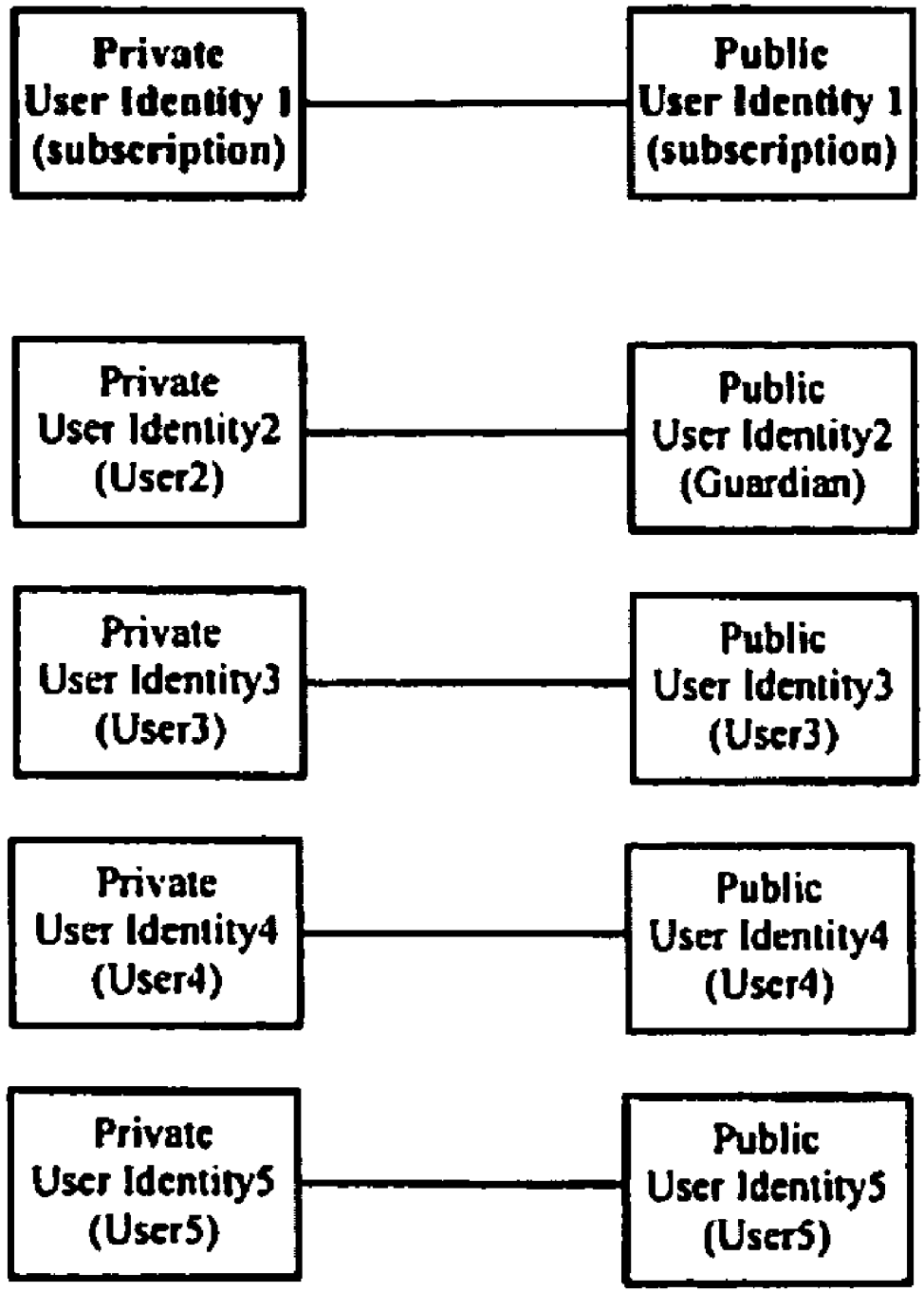
FIG. 1 illustrates the one-to-one relationship between private and public user identities in the IP Multimedia Subsystem (IMS) 3GPP specification.

FIG. 1 illustrates the one-to-one relationship between private and public user identities in the IP Multimedia Subsystem (IMS) 3GPP specification. Note that the subscription or default user is always associated with the browser. Once the browser is initiated and communication is established with the IPTV Network portal, the methods in Table 1 below may be performed.

TABLE 1

| | |
|---|---|
| logoffUser | De-registration from IMS |
| getRegisteredUsers | The list of users that are registered with IMS is indicated. The default user used for registration and subscription to IPTV service is not listed. |

Table 2 below illustrates User Access Control Procedures for Properties.

TABLE 2

| Property | Procedures |
|---|---|
| userId | When initiating a feature like broadcast playLive, if userId property is specified, then the indicated user identifier is used for the session initiation. If it is not specified, then the default userId related to initiating the browser is used. |

Figure 2:
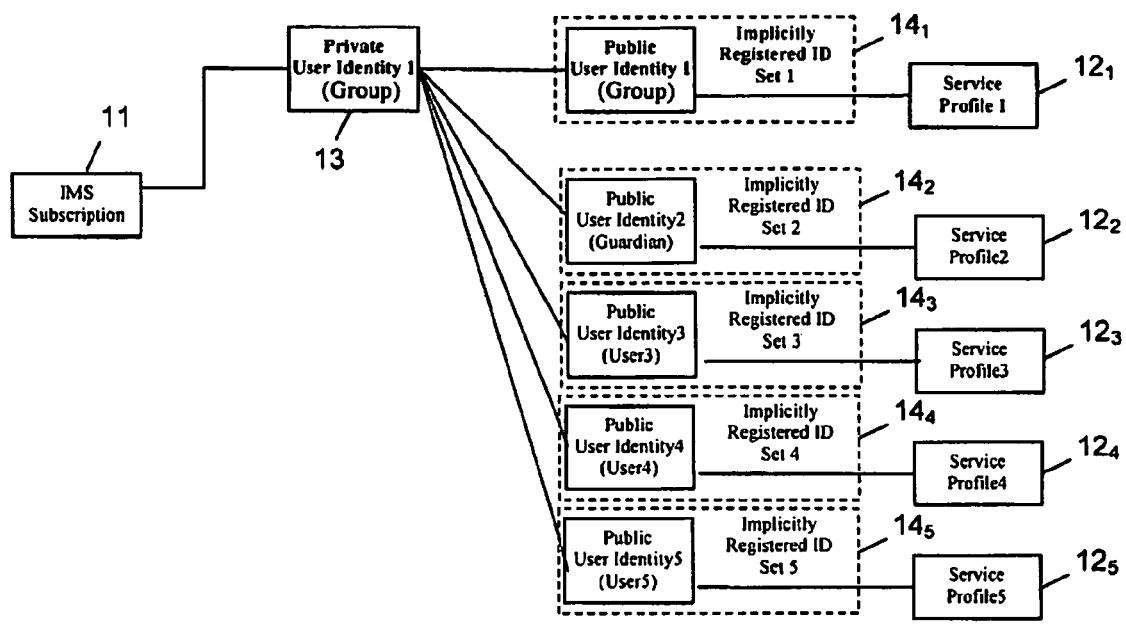
FIG. 2 is a functional block diagram illustrating the relationships between the IMS subscription, IMS service profiles, and private and public user identities in an embodiment of the present invention.

FIG. 2 is a functional block diagram illustrating the relationships between the IMS subscription 11, IMS service profiles $12_1$-$12_5$, and private and public user identities in an embodiment of the present invention. Assuming the browser in the STB totally controls the login process for IMS, it is not necessary to have different IMS credentials for each user in the group. The same IMS credentials, i.e., password and IMS Private User Identity (IMPI) 13 are shared for the whole subscription. A plurality of implicitly registered IMS Public User Identities (IMPUs) $14_1$-$14_5$ are associated with the shared IMPI to reach a number of different service profiles.

Thus, it is only necessary to provision in the STB, the group subscription account with the password and shared IMPI 13. The individual accounts are dynamically indicated over the browser javascript API. New accounts in the group can be added or removed without having to manually update the STB with the new user information. This would otherwise be a tedious process with the user having to insert long strings of characters using a basic remote control.

In another embodiment, the browser may be implemented in a mobile terminal. The portal may be implemented in an IAP IPTV Application platform which is an Application Server (AS).

The Group account (User id 1) is the default account which is connected to the IPTV portal. All communication with the portal takes place over this account. The browser indicates for individual services which User ID is invoking the requested service, such as play or playLive. Private User IDs (IMPIs) for the individual users in the device are optional. IMPIs may be desirable if other local services are available in the device not controlled from the browser, or if the operator desires stricter security than that provided by the PIN. All users invoked from the browser use the Group Private User ID if no individual IMPIs are defined.

A benefit of this relationship is that the password is only exchanged at bootstrap and the password is not exposed outside of that bootstrap. Additionally, only one User ID needs to be downloaded during bootstrap of even manual configuration of the Public/Private User ID. The browser can control which users are available within the same IPTV subscription. Each user's PIN then becomes the security preventing illegal usage of the different user accounts like a guardian account.

The User ID and password may be pre-configured in the STB. The information may be pre-configured in the STB manually or automatically. If done manually, the User ID and password are inserted manually when the STB connects to the IPTV Network. If done automatically, the STB may automatically connect to an IPTV bootstrap server, which provides an xml file with the User ID and password associated with the STB.

For both the manual and automatic methods, it is necessary to register the STB in the IPTV Network. To do so, a set of registration parameters regarding each STB is made available to the operator. The parameters include a Public STB Identifier (for example MAC address) and a Private STB Identifier (a unique key to each STB not visible to the user). The Public STB ID is used to register the equipment against the customer account or subscription. The equipment cannot be used by a customer without registration. The Private STB ID is used in the automatic configuration of the User ID and password which are delivered during IPTV bootstrapping.

In IMS, a User Access Control function controls the logging in of users. The initialization of the browser is associated with a default user, while each feature that is invoked may be associated with a different user. The RegisteredUsers data object represents a list of users that are currently registered with IMS. Items in the data object can be accessed using array notation. Table 3 below illustrates the properties of the RegisteredUsers data object.

TABLE 3

| | | |
|---|---|---|
| readonly String userId | | The user identifier represents the public user identity |

Tables 4a-4c below illustrate methods of logging users on and off IMS and getting registered users.

TABLE 4a

| Integer logonUser (String userId) | | |
|---|---|---|
| Description | The indicated user shall be registered in IMS. | |
| Attributes | userId | The user identifier. |

TABLE 4b

| Boolean logoffUser (String userId) | | |
|---|---|---|
| Description | The indicated user is de-registered from IMS. Any sessions that may be open are closed. | |
| Attributes | userId | The user identifier. |

TABLE 4c

| RegisteredUsers getRegisteredUsers ( ) | |
| --- | --- |
| Description | The STB returns all the users that are registered with IMS through this interface. |
| Attributes | |

Figure 3:
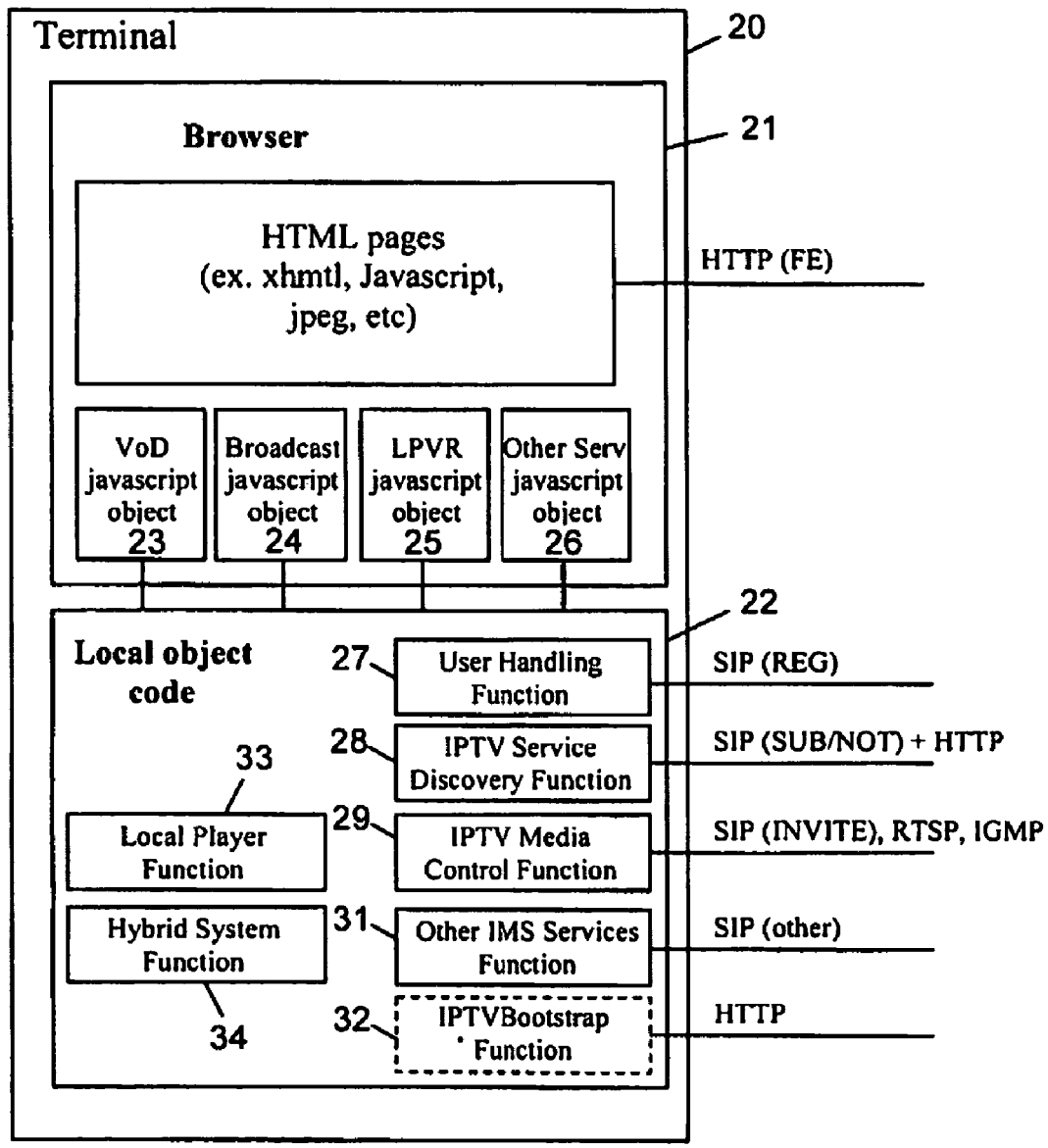
FIG. 3 is a functional block diagram of a terminal, which includes a browser and local object code in an exemplary embodiment of the present invention.

FIG. 3 is a functional block diagram of a terminal 20, which includes a browser 21 and local object code 22 in an exemplary embodiment of the present invention. The browser and local object code may be implemented in a STB or an OITF compliant device. The browser provides the presentation to the user of the IPTV services. Within the browser, a number of exemplary javascript objects are shown: a Video on Demand (VoD) javascript object 23, a Broadcast javascript object 24, a LPVR javascript object 25, and an Other Services javascript object 26. The javascript objects may utilize a standardized interface, aligned with the OITF API. The javascript objects then communicate with the local object code 22 which then provides all the necessary procedures and signaling with SIP, RTSP and HTTP to realize the services.

The local object code 22 is shown as being divided into a number of exemplary logical functional modules. A User Handling Function module 27 keeps track of the user(s) that are defined in the device. Once defined, any authentication that is required by any interface is retrieved from the User Handling Function module. For IMS deployments, it is necessary to perform registration with IMS prior to providing any IPTV or other IMS service. Multiple users may be registered. Note that only one user is associated with the browser, which is initiated by an IPTV Service Discovery Function module 28.

The IPTV Service Discovery Function module 28 performs the IPTV service discovery, which is the subscription to IPTV service in IMS. The response to the subscription provides the portal address and the URL to fetch the IPTV broadcast channel information. The broadcast channel information provides the details necessary to signal the Internet Group Management Protocol (IGMP) requests by an IPTV Media Control Function module 29. The portal address is used to start up the browser and load the initial IPTV presentation.

The IPTV Media Control Function module 29 controls unicast and multicast streams. For IMS deployments, the session initiation and teardown process is performed with SIP. For plain IPTV deployments, the session setup and teardown process is performed with RTSP. The media playback is performed with RTSP, while the broadcast selection and zapping is performed using IGMP.

An Other IMS Services Function module 31 attempts to capture the services not directly provided by IPTV, such as Presence, Messaging, and Chat services. These services have no direct media interaction except with the browser or local client software implementing the service.

An optional IPTV Bootstrap Function module 32 facilitates easier deployments of IPTV. At startup, the device connects to a preconfigured URL with a hardware identifier and an encrypted key, which is used to tie to a subscription. If the subscription is associated to hardware and the key is confirmed, then an xml file is downloaded with details of user accounts and password.

A Local Player Function module 33 may provide local storage control, provided there is a local hard disk, for broadcasted information both multicast and DVB-T streams.

A Hybrid System Function module 34 indicates when there may be other types of delivery of TV over terrestrial, satellite, and cable. In order for IPTV services to be integrated with a hybrid system, it is necessary to have access to the channel identifier so the presentation can be customized for those channels.

Prior to the browser 21 being initiated for IPTV, the local object code 22 performs the initial registration to IMS, as well as subscribing to the IPTV service using the default user. The default user includes the Public User Identity (IMPU) 14, the Private User Identity (IMPI) 13, and the password (IMS credentials). This information is either typed in manually or is automatically retrieved from the IPTV Bootstrap Server. If manually inserted, the Private User Identity is the same value as the Public User Identity.

Figure 4:
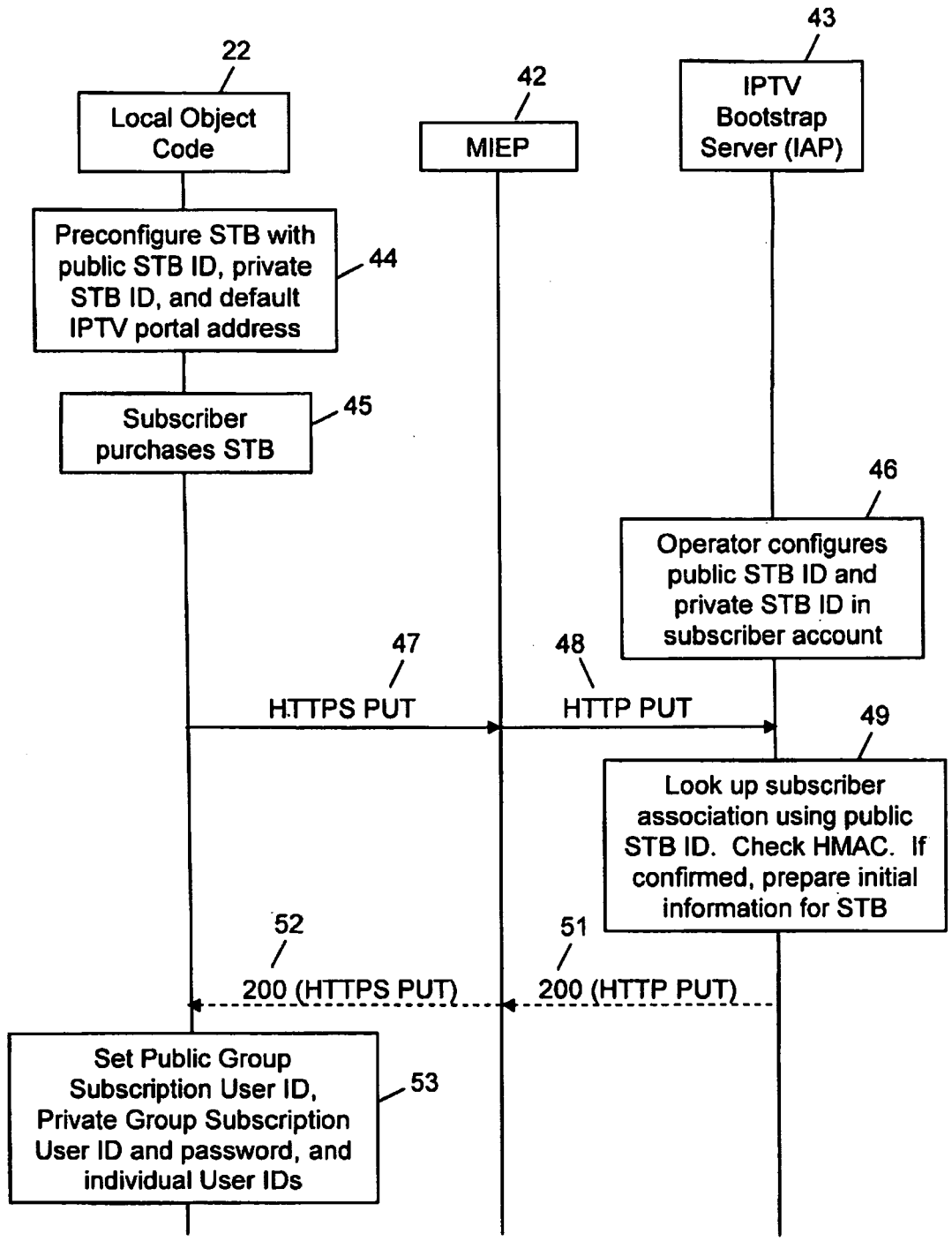
FIG. 4 illustrates a bootstrapping process by which an STB is provisioned with a Public Group Subscription User ID, Private User ID, and password.

FIG. 4 illustrates a bootstrapping process by which an STB is provisioned with a Public Group Subscription User ID, Private User ID, and password. The process is performed by the local object code 22, a wireless application protocol proxy referred to herein as a Mobile Internet Enabling Proxy (MIEP) 42, and an IPTV Bootstrap Server, which includes an IPTV Application Program (IAP) 43. At step 44, the STB is preconfigured with a public STB ID such as a MAC address, a private STB ID, and a default IPTV portal address for initial connection. The private STB ID is not visible in the STB. If no private STB ID exists for the STB, one may be given to the user so it can be inserted at startup.

At step 45, a subscriber purchases the STB. At this time, as shown in step 46, the operator configures the subscriber account with the public STB ID (for example MAC address) to be used for entitlement and the private STB ID. The private STB ID is not transmitted over the network, and as noted above, is not visible in the STB. The local object code 22 then sends an HTTPS PUT message to the MIEP 42, which sends an HTTP PUT message to the IPTV Bootstrap Server 43. In response, the server looks up the subscriber association at step 49 using the public STB ID. The server checks the Hash Message Authentication Code (HMAC) and if confirmed, prepares initial information for the STB. The initial information may include a Group Subscription User ID, authentication information for the Group Subscription User ID, and User IDs for individual users in the group. The initial information is then returned to the local object code in a 200 (HTTP PUT) message 51 and a 200 (HTTPS PUT) message 52. At step 53, the local object code sets the Public Group Subscription User ID, Private Group Subscription User ID and password, and individual User IDs. These data are used later for SIP/HTTP communication and authentication.

Figure 5:
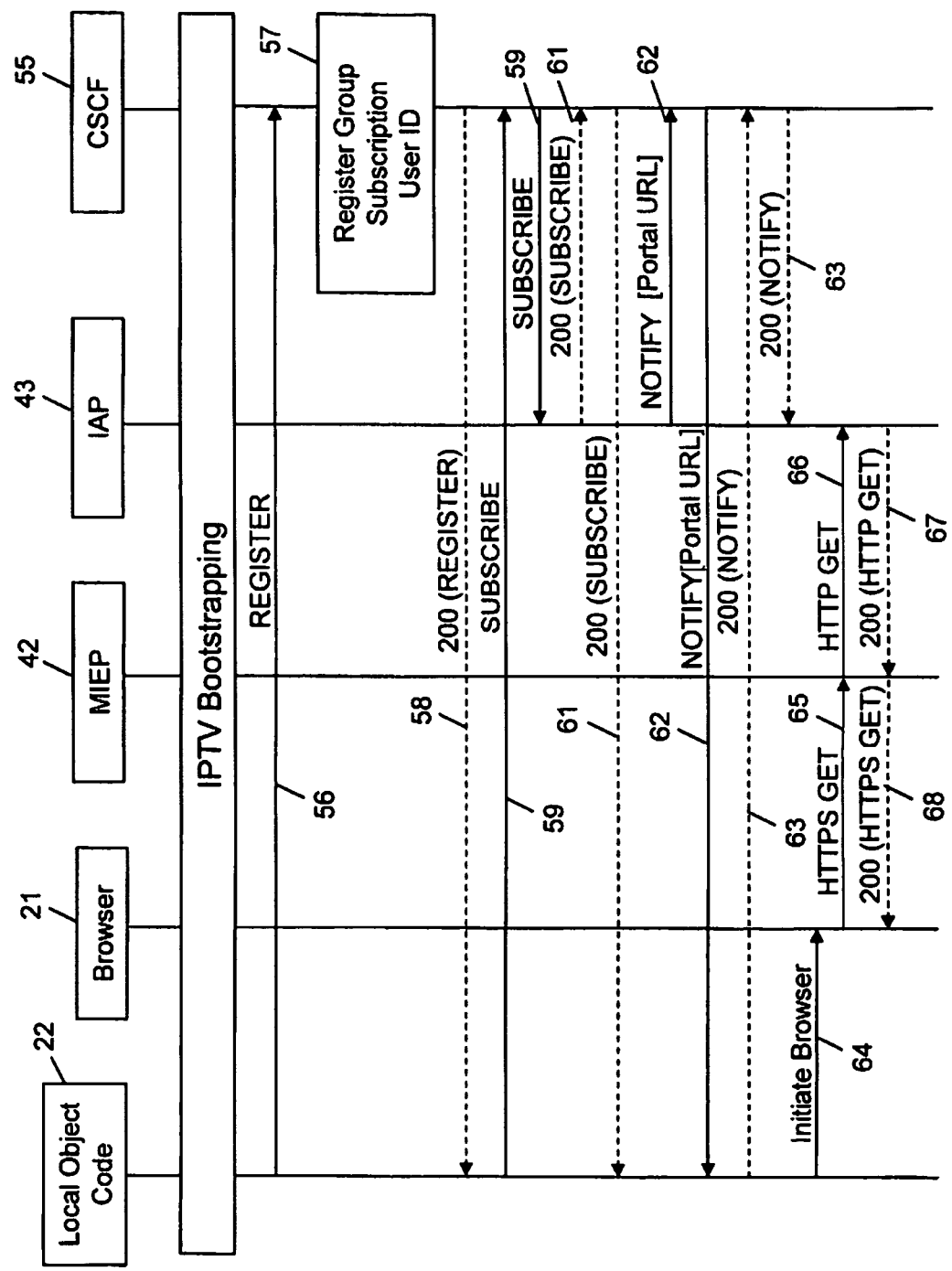
FIG. 5 is a signaling diagram illustrating the steps of a process in which the Group Subscription User ID is registered with IMS, the local object code learns the address of an IPTV Application Program (IAP), and IPTV is initiated.

FIG. 5 is a signaling diagram illustrating the steps of a process in which the Group Subscription User ID is registered with IMS (steps 56-58), the local object code learns the address of an IPTV Application Program (IAP) (steps 59-63), and IPTV is initiated (steps 64-68). The process of FIG. 5 is performed after the STB is provisioned with a Public Group Subscription User ID, Private User ID, and password. This may be done in a number of different ways. For example, it may be done manually, remotely by an operator, or with a bootstrapping process such as that shown in FIG. 4. With reference to FIG. 5 and FIG. 3, the process will now be described.

The User Handling Function module 27 in the local object code 22 sends a REGISTER message 56 to the CSCF, which registers the Group Subscription User ID at 57 and returns a 200 (REGISTER) message 58 to the local object code. This registers the Group Subscription User ID with IMS. The IPTV Service Discovery Function module 28 in the local object code then sends a SUBSCRIBE message 59 to the CSCF, which forwards the SUBSCRIBE message to the IAP 43. The IAP returns a 200 (SUBSCRIBE) message 61 to the CSCF, which forwards the 200 (SUBSCRIBE) message to the local object code.

The IAP 43 then sends a NOTIFY message 62 to the CSCF 55 and includes a portal URL for the IPTV Portal (i.e., the IAP 43). The CSCF forwards the NOTIFY message to the local object code 22, which returns a 200 (NOTIFY) message 63. At this point, the local object code has learned the address of the IAP.

At 64, the IPTV Bootstrap Function module 32 in the local object code then initiates the STB browser 21. The STB browser sends a HTTPS GET message 65 to the MIEP 42, which forwards a HTTP GET message 66 to the IAP. The IAP returns a 200 (HTTP GET) message 67 to the MIEP, which forwards a 200 (HTTS GET) message 68 to the STB browser. At this point, the Group Subscription User ID is registered with IMS, the local object code 22 has portal and channel information for the IAP 43, and IPTV is initiated.

Figure 6:
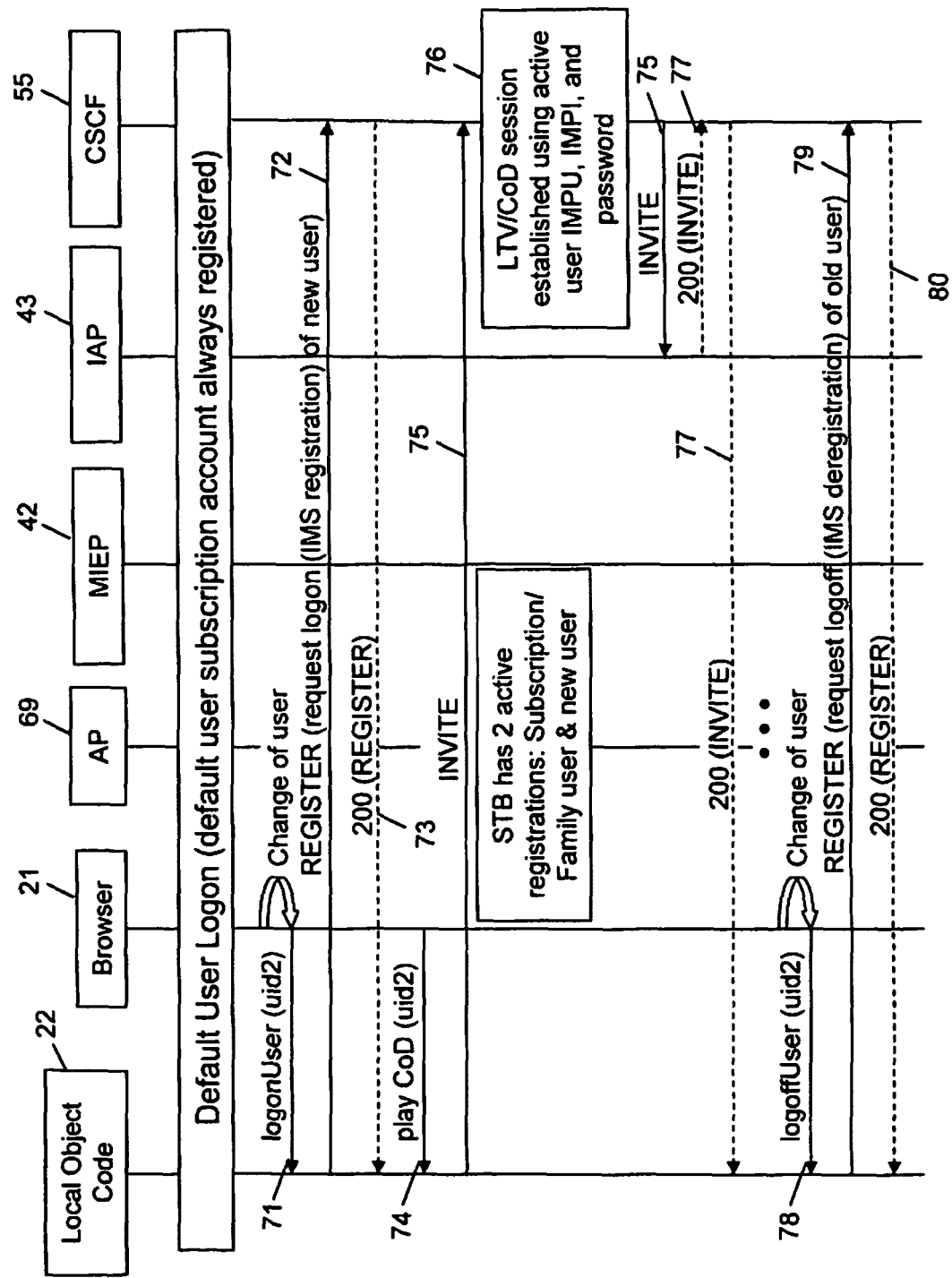
FIG. 6 is a signaling diagram illustrating the steps of a process of changing users according to the teachings of the present invention.

FIG. 6 is a signaling diagram illustrating the steps of a process of changing users according to the teachings of the present invention. The signaling goes through the same nodes as FIG. 5, with the addition of an Access Point (AP) 69. As an initial condition, a default user is logged on. Note that the default user (subscription account) is always logged on. With reference to FIG. 6 and FIG. 2, the process will now be described.

When a new user indicates a change of user to the STB browser 21, the STB browser sends a logonUser message 71 to the local object code 22 with the User ID of the new user, for example User 2. The User Handling Function module 27 in the local object code then sends a REGISTER message 72 to the CSCF 55 requesting logon (IMS registration) of the new user. The CSCF returns a 200 (REGISTER) message 73 to the local object code.

At 74, the STB browser 21 indicates to the local object code 22 that User 2 desires to play Content on Demand (CoD). The IPTV Media Control Function module 29 in the local object code sends an INVITE message 75 to the CSCF 55. At this point in time, the STB has two active registrations: one for the Group Subscription user, and one for the current active user (User 2). Note that no SUBSCRIBE message is required to begin the session. At 76, the CSCF establishes the Linear TV/Content on Demand (LTV/CoD) session using the active user IMPU, IMPI, and password. The CSCF forwards the INVITE message 75 to the IAP 43 to establish the session. The IAP returns a 200 (INVITE) message 77 to the CSCF, which forwards the 200 (INVITE) message to the local object code.

At a later time, another change of user is indicated. The STB browser 21 sends a logoffUser message 78 to the local object code 22 indicating that User 2 has logged off. The User Handling Function module 27 in the local object code sends another REGISTER message 79 to the CSCF requesting logoff (IMS deregistration) of the old user. The CSCF returns a 200 (REGISTER) message to the local object code and the old user is deregistered. The new user is then logged on using the process shown in steps 71-73. Note that the browser is not reset. There is a seamless change of users handled by the local object code.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of providing Internet Protocol Television (IPTV) and other communication services to a group of users of an IP Multimedia Subsystem (IMS) network, said method comprising the steps of:
    associating in a local object code of a terminal, a group private user identity with a group public user identity and with a plurality of individual public user identities, each individual public user identity being associated with a different user in the group;
    registering a group subscription with the IMS network utilizing the group private user identity and the group public user identity;
    obtaining by the local object code, an address of an IPTV Portal from the IMS network;
    initiating IPTV service for the group subscription through the address of the IPTV Portal; and
    registering a first individual user with the IMS network only when the individual public user identity associated with the first individual user is received by the terminal, while maintaining the group registration with the IMS network, thereby providing the first user with IPTV service without restarting a browser in the terminal.

2. The method as recited in claim 1, further comprising the steps of:
    receiving in the terminal, an indication of a change of user from the first individual user to a second individual user; and
    registering the second individual user with the IMS network in response to the user change, while maintaining the group registration with the IMS network, thereby providing the second user with IPTV service without restarting the browser.

3. The method as recited in claim 2, wherein the step of receiving an indication of a change of user includes receiving a personal identification number (PIN) of the second individual user.

4. The method as recited in claim 3, wherein the terminal is a set top box.

5. The method as recited in claim 4, further comprising pre-configuring the set top box with the group public user identity, group private user identity and group password, and individual identities of the users in the group.

6. The method as recited in claim 5, wherein the pre-configuring step is performed automatically by connecting the set top box to an IPTV bootstrap server, which provides the group public user identity and the password to the set top box.

7. The method as recited in claim 3, wherein the terminal is a mobile terminal.

8. A terminal for providing Internet Protocol Television (IPTV) and other communication services to a group of users of an IP Multimedia Subsystem (IMS) network, said terminal comprising:
    at least one processor;
    a non-transitory computer-readable storage medium further comprising computer-readable instructions, when executed by the at least one processor, are configured for:
        associating a group private user identity with a group public user identity and with a plurality of individual public user identities, each individual public user identity being associated with a different user in the group;
        registering a group subscription with the IMS network utilizing the group private user identity and the group public user identity;

obtaining an address of an IPTV Portal from the IMS network;

initiating IPTV service for the group; and registering a first individual user with the IMS network only when the individual public user identity associated with the first individual user is received, while maintaining the group registration with the IMS network, thereby providing the first user with IPTV service without restarting a browser in the terminal.

9. The terminal as recited in claim 8, wherein the computer-readable instructions, when executed by the at least one processor, are further configured for:

receiving an indication of a change of user from the first individual user to a second individual user; and registering the second individual user with the IMS network in response to the user change, while maintaining the group registration with the IMS network, thereby providing the second user with IPTV service without restarting the browser.

10. The terminal as recited in claim 9, wherein the computer-readable instructions configured for receiving an indication of a change of user are further configured for receiving a personal identification number (PIN) of the second individual user.

11. The terminal as recited in claim 10, wherein the browser includes an Application Programming Interface (API) for controlling local object code to register the group subscription with the IMS network, and to maintain the group registration while changing individual users.

12. The terminal as recited in claim 10, wherein the terminal is a set top box.

13. The terminal as recited in claim 12, wherein the computer-readable instructions are further configured for pre-configuring the set top box with the group public user identity and a password.

14. The terminal as recited in claim 13, wherein the computer-readable instructions configured for pre-configuring the set top box are further configured for automatically connecting the set top box to an IPTV bootstrap server, which provides the group public user identity and the password to the set top box.

15. The terminal as recited in claim 10, wherein the terminal is a mobile terminal.

* * * * *

UNITED STATES PATENT AND TRADEMARK OFFICE
CERTIFICATE OF CORRECTION

PATENT NO.        : 8,191,100 B2                                   Page 1 of 1
APPLICATION NO.   : 12/236673
DATED             : May 29, 2012
INVENTOR(S)       : Lindquist et al.

It is certified that error appears in the above-identified patent and that said Letters Patent is hereby corrected as shown below:

In Fig. 3, Sheet 3 of 6, for Tag "21", in Line 3, delete "xhmtl," and insert -- xhtml, --, therefor.

In Column 2, Line 31, delete "DRAWING" and insert -- DRAWINGS --, therefor.

In Column 7, Line 16, delete "(HTTS GET)" and insert -- (HTTPS GET) --, therefor.

Signed and Sealed this
Eleventh Day of September, 2012

David J. Kappos
*Director of the United States Patent and Trademark Office*